(12) United States Patent
Johan

(10) Patent No.: US 6,510,222 B1
(45) Date of Patent: Jan. 21, 2003

(54) MINIATURE CONNECTOR ARRAY

(75) Inventor: Ron Johan, Bondi Junction (AU)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/269,695

(22) PCT Filed: Jul. 22, 1998

(86) PCT No.: PCT/EP98/05102

§ 371 (c)(1),
(2), (4) Date: Jun. 4, 1999

(87) PCT Pub. No.: WO99/05589

PCT Pub. Date: Feb. 4, 1999

(30) Foreign Application Priority Data

Jul. 25, 1997 (AU) ................................................ P08216

(51) Int. Cl.⁷ ........................ H01H 63/00; H01H 67/00; H01H 51/00; H04Q 3/00
(52) U.S. Cl. .................... 379/291; 335/112; 340/2.28; 379/304; 379/305; 379/306
(58) Field of Search ....................... 324/158.1; 379/291, 379/292, 299, 303, 304, 305, 306; 335/112, 152; 340/2.28

(56) References Cited

U.S. PATENT DOCUMENTS

| 4,075,433 A | * | 2/1978 | Mitsuhashi et al. .......... 379/291 |
| 5,111,414 A | | 5/1992 | Arrathon ..................... 708/191 |
| 5,426,361 A | | 6/1995 | Simmons ................. 324/158.1 |

FOREIGN PATENT DOCUMENTS

WO   WO 97/14283   4/1997   ............ H05K/7/00

* cited by examiner

Primary Examiner—Harry S. Hong
(74) Attorney, Agent, or Firm—Sughrue Mion, PLLC

(57) ABSTRACT

A line multiplier is formed of n upstream lines and m downstream lines where m>n by providing a micro-technology array of m×n crosspoints switches using, e.g., magnetic latching, wherein the latching magnets are heated to the Curie temperature to cause the state of a switch to change.

11 Claims, 4 Drawing Sheets

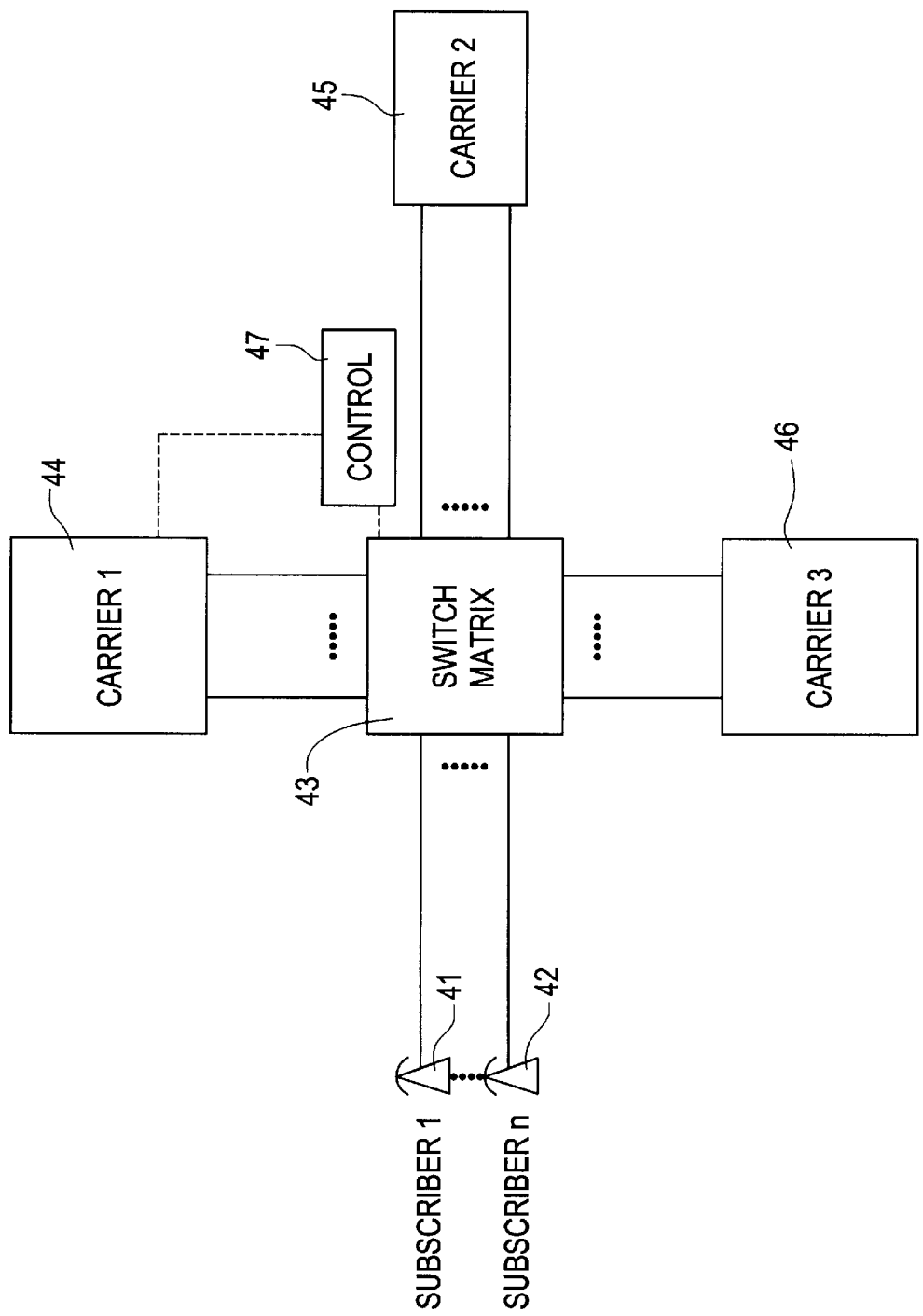

MINIATURE CONNECTOR ARRAY

BACKGROUND OF THE INVENTION

This invention relates to an arrangement for providing electrically transparent selectable connections in a communications system.

The invention will be described with reference to the connection of subscriber lines to exchange lines, such as at a "pillar" or street connection box, or at an exchange, although the system is also suitable for use for connecting other types of lines such as ADS lines connecting a set-top box to a programme distribution centre.

Currently, subscriber line to exchange line connection is performed manually using jumper leads. Because the connections are done manually, the connection points must be large enough to facilitate manual connection.

SUMMARY OF THE INVENTION

An additional disadvantage of this system is that a technician must be at the location of the connection box to carry out the connection.

This specification discloses an array of individually controllable contacts to enable any one of a first group of points to be connected to a selected one of a second group of points, wherein the contacts are implemented in micro-machine technology and form electrical contacts which are substantially transparent to electrical signals.

In a preferred embodiment, each of the individually controllable contacts includes remotely actuable control means to controllably open and close the associated contacts.

In one embodiment, for a bi-stable switch, the contacts include first and second fixed contacts and a movable contact, such as a contact armature which includes magnetic material and is associated with a permanent magnet to latch the armature in a first position, wherein controllable heating means are provided to heat one of the contacts to or above the Curie temperature of the magnetic material, the armature being resiliently cantilevered or pivotally mounted to move to a second position when the armature is de-magnetized.

In an alternative embodiment, the armature is operated electro-mechanically.

In a further embodiment, the armature is operated by piezo-electric actuator means.

While remote switching can be performed using semiconductor switches, the device of the present invention has the advantage that the mechanical contacts are effectively electrically transparent, the implementation in micro technology providing the advantage of small size and the ability to remotely control the switching of the contacts.

BRIEF DESCRIPTION OF THE DRAWING

The invention will be described with reference to the accompanying drawings in which:

FIG. 4 shows the connection of a switching array according to a further embodiment of the invention.

DETAILED DESCRIPTION OF THE INVENTION

Figure 1:
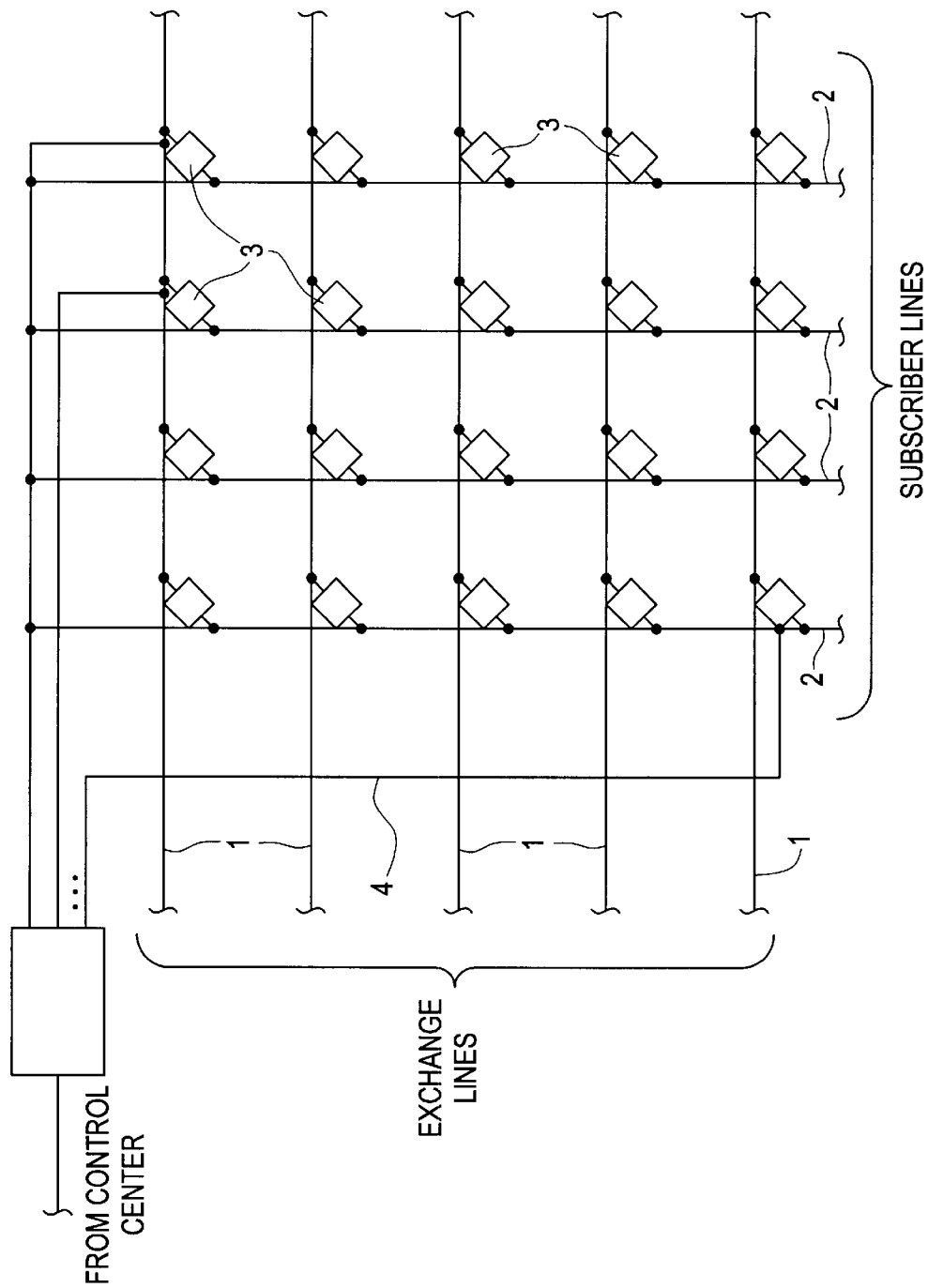
FIG. 1 shows an array of remotely controllable contacts in accordance with an embodiment of the invention.

In FIG. 1, a group of exchange lines 1, are arranged to be interconnected with a group of subscriber lines 2, by an array of micro-machine contacts 3.

The micro-machine contacts 3 are individually controllable by a control circuit 4, which is controlled from a control centre via a communication link.

In one embodiment, the communication link may also be used to supply power to operate the array, in a manner analogous to the central battery supply for standard telephones.

At the control centre, a database may be used to control the interconnection of subscriber and exchange lines. For example, the exchange lines may be used to define the columns of a matrix and the subscriber lines may define the rows. Data, e.g. "1" at an intersection indicates a connection and lack of data or zero indicates no connection. A macro could then be used to generate control signals for transmission to the control circuit 4 which decodes the control signals and operates the appropriate switches.

In this way connections between a group of subscriber lines and a group of exchange lines can be established remotely.

In a further embodiment the array of switches can be used to perform a line multiplier function, wherein a first number of exchange lines, n, is used to provide communication for a second number of subscriber lines, m, where m>n.

In such an arrangement sensing means are provided to detect when a subset connected to a subscriber line goes off-hook, and exchange line monitoring means locates an idle exchange line, so that control means can connect the activated subscriber line to the idle exchange line.

Figure 2:
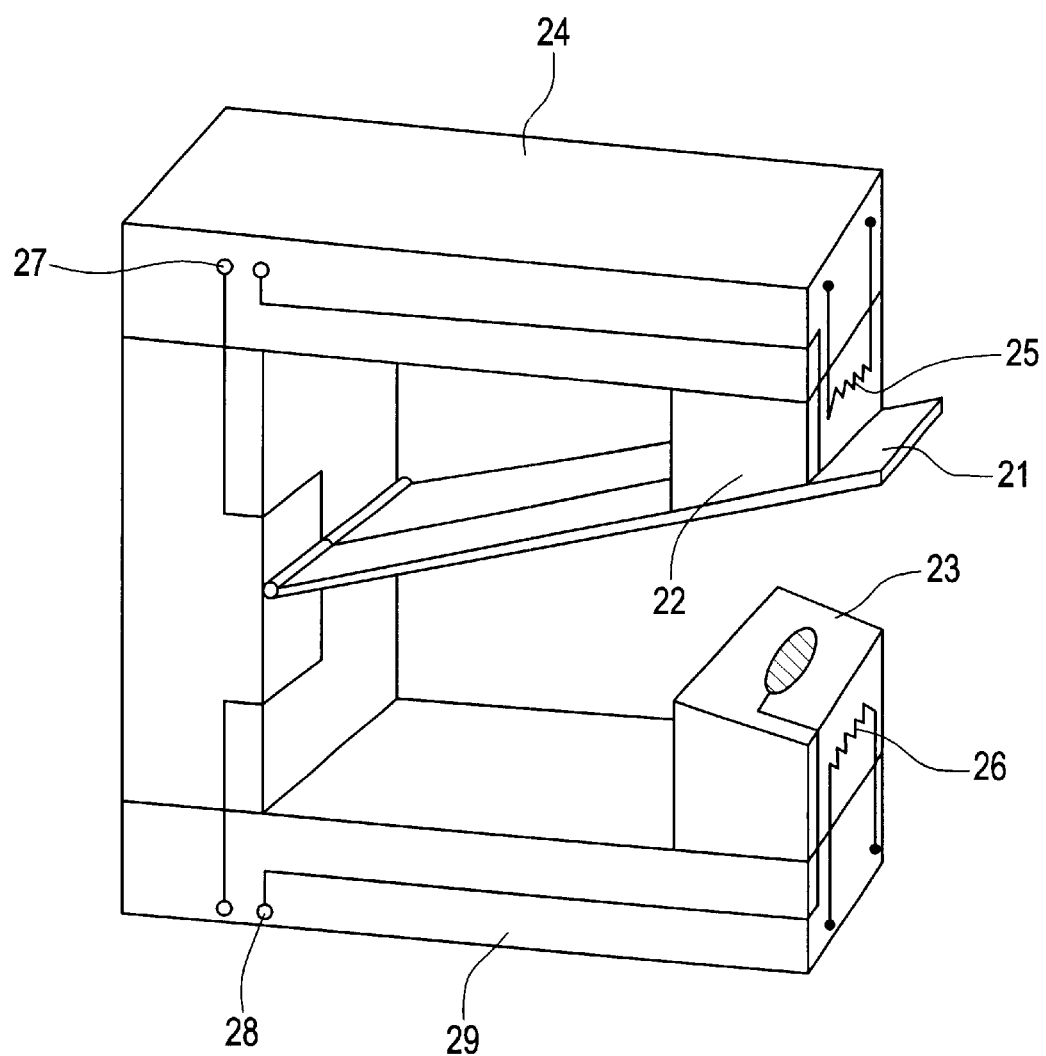
FIG. 2 schematically represents a bi-stable switch for use in the array of FIG. 1.

An arrangement for a thermally actuated, magnetic latching, bi-stable switch is shown in FIG. 2. In FIG. 2, a contact arm 21 can be switched between a first fixed contact 22 and a second fixed contact 23.

Each fixed contact 22, 23 is adapted to make electrical contact with the armature. This may be achieved by applying dedicated contact pads and associated conductor tracks, or the fixed contacts may themselves be made of conductive material.

Likewise the armature may have conductive contact pads on either face connected to conductive tracks, or the armature may be made of conductive material.

If the armature carries mutually insulated contact pads and conductor tracks on opposite faces, the switch may be used to operate galvanically isolated circuits, 27, 28.

The armature is made of magnetic material and is pivotally mounted or cantilevered resiliently to enable it to make contact with the first or second fixed contact.

Both the first and second fixed contacts are in a switchable magnetic circuit with a permanent magnet, 24, 29, the armature forming a part of the magnetic circuit with whichever fixed contact it is in contact. When the array is used as a line multiplier in a central battery telephone system, one of the switches of the row to which a subscriber line is connected is used to connect the subscriber line to a power supply rail while the subscriber line is idle. Then an exchange line is allocated to the subscriber line and the appropriate array switch activated, the power supply rail is released.

Each fixed contact carries a heat element, 25, 26, by which the magnetic material in the fixed contact can be heated above its Curie temperature to cause its magnetic susceptibility to be substantially decreased. The air gap between the armature and the other, unheated fixed contact, and the strength of the magnetic field are so dimensioned that the armature then is attracted to that unheated fixed contact and switches to that fixed contact.

Figure 3:
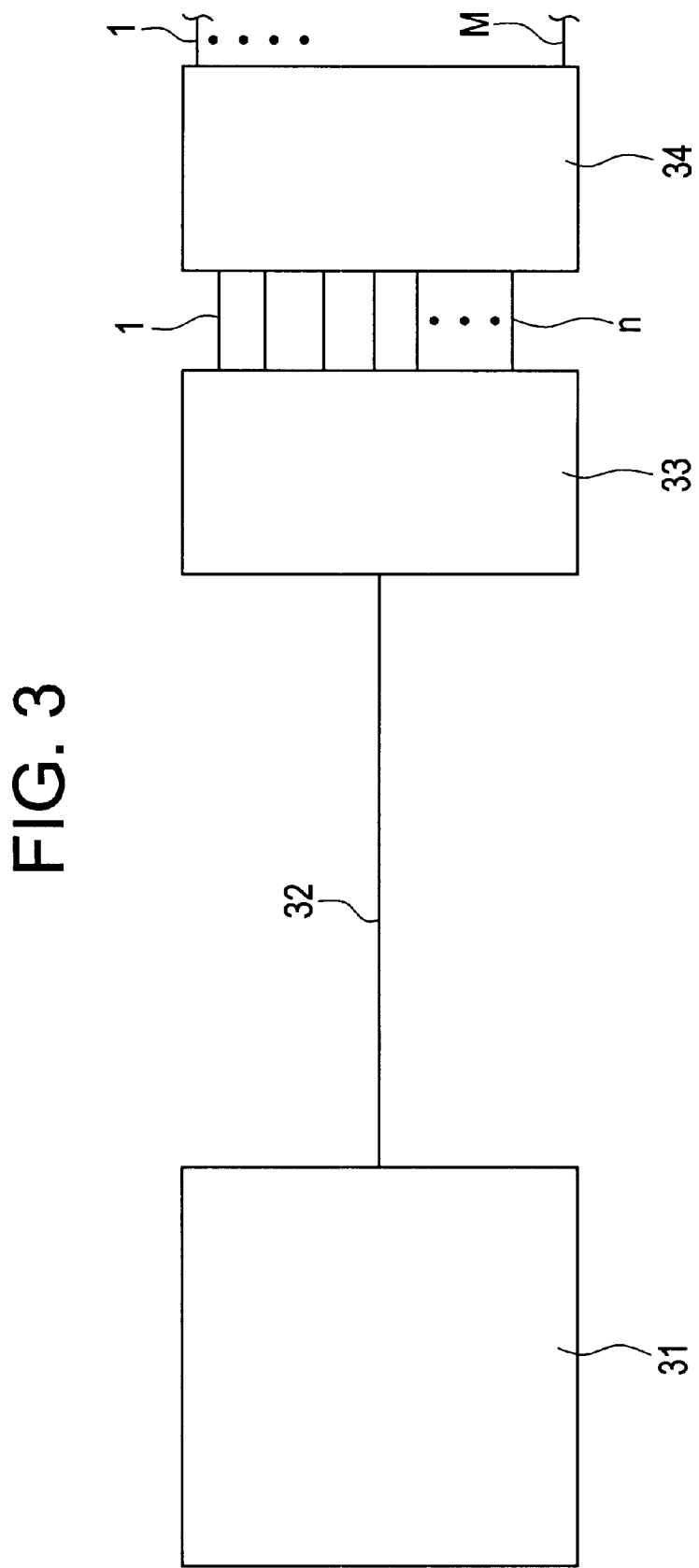
FIG. 3 shows a line multiplier application of the invention.

FIG. 3 shows a switching arrange connected as a line multiplier to a Digital Line Concentrator (DLC).

In FIG. 3 an exchange, 31, is connected to a DLC, 33, via a high speed link 32 e.g. a V5.2 link which provides, e.g. 30 communication channels.

The DLC 33 has n (e.g.30) downstream links connected to one side of an n×m switch array acting as a line multiplier.

For a downstream connection, the exchange sends a request to be connected to the called subscriber via a signalling channel of the V5.2 link. This request will also identify the channel allocated for the call. The DLC relays the request to the switch matrix control which causes the called subscriber's line to be connected to a free link between the switch, 34, and the DLC, 33. The DLC then establishes the communication in the allocated channel.

For an upstream call, detector means detect that the subscriber means wishes to establish a path (e.g. OFF-HOOK detection, packet request), and the switch matrix control establishes a link between the subscriber line and one of the n lines which is free. The DLC then establishes communication with the exchange 31 via the link 32 in the known manner.

It should be noted that the subscriber request for a link may be generated by a telephone subset going off-hook, or e.g. by a packet signalling request from a TV set-top box or other known means.

The word "downstream" is used in the claims to refer to connections on the subscriber side of the array, and "upstream" refers to connections on the exchange or programme distribution centre side of the array.

In a further embodiment, shown in FIG. 4, the switching array (43) is used to connect customer lines to the network of one of two or more carriers. In the embodiment shown, the line from each individual subscriber (subscriber 1 to 3) (41,42) may be switched independently to the network of any one of three carriers (carrier 1 to 3) (44 to 46). In this way, the introduction of competition into networks where there was previously only one carrier can be implemented is a straight forward manner. The original carrier (carrier 1) may be designated as the carrier responsible for controlling the switching of individual subscribers to the carrier of their choice via the switching control, 47. Alternatively this responsibility may be given to an independent body (not shown) which would control the connection of subscribers to carriers at the subscribers's option.

The claims defining the invention are as follows:

1. A connection array consisting of a plurality of cross-connection points, each cross-connection point including a pair of mutually insulated conductors operable by a controllable switch, wherein the controllable switch is formed using micro-machine technology.

2. A connector array as claimed in claim 1, including a power supply rail to which idle subscriber lines are connectable via the array.

3. The connector array as claimed in claim 1, wherein said connection array is used in a line multiplier arrangement, said line multiplier arrangement comprising m downstream lines and n upstream lines, where m>n, and wherein downstream line detector means are used to detect when a downstream line requests a connection and to connect an off-hook downstream line to a free upstream line.

4. A line multiplier arrangement using a connection array, said arrangement comprising m downstream lines and n upstream lines, where m>n, wherein downstream line detector means are used to detect when a downstream line requests a connection and to connect an off-hook downstream line to a free upstream line, and wherein said connection array consists of a plurality of cross-connection points, each cross-connection point including a pair of mutually insulated conductors operable by a controllable switch, wherein the controllable switch is formed using micro-machine technology.

5. An arrangement as claimed in claim 4, including outgoing call detector means to connect an upstream line carrying a call to a called downstream line.

6. The arrangement as claimed in claim 4, wherein the downstream line detection means are used to detect when the equipment on the downstream line is activated, upstream line monitor means are used to identify an idle upstream line, and line seizing means are used to connect the activated downstream line to an idle upstream line.

7. An arrangement as claimed in claim 6, including downstream line identification means to transmit the identity of the activated downstream line connected to an idle upstream line to toll apparatus in the exchange.

8. An arrangement as claimed in claim 7, wherein the identity is transmitted via the upstream line.

9. An arrangement for controlling the connection of downstream lines to upstream lines using a connection array, the arrangement including a control center having programmable control means to generate control signals to control the operation of the controllable switches, wherein the connection array consists of a plurality of connection points, each cross-connection point including a pair of mutually insulated conductors operable by a controllable switch, the controllable switch being formed using micro-machine technology.

10. The arrangement as claimed in claim 9, wherein the connection array is remote from the control center, and wherein the programmable control means transmits power control signals to a switch controller located proximate to the connection array, the switch controller controlling the operation of the controllable switches in response to the control signals.

11. A communication system including an exchange connected to a digital line concentrator (DLC) via a high speed link, the line side of the DLC being connected to a line multiplier arrangement, said arrangement comprising m downstream lines and n upstream lines, where m>n, wherein downstream line detector means are used to detect when a downstream line requests a connection and to connect an off-hook downstream line to a free upstream line, and wherein said connection array comprises a plurality of cross-connection points, each cross-connection point including a pair of mutually insulated conductors operable by a controllable switch, wherein the controllable switch is formed using micro-machine technology.

* * * * *